US012626147B1

(12) United States Patent
Rose et al.

(10) Patent No.: US 12,626,147 B1
(45) Date of Patent: May 12, 2026

(54) METHOD AND SYSTEM FOR NETWORK QUERY CONSTRUCTION USING RETRIEVAL-AUGMENTED GENERATION (RAG), AND APPLICATIONS THEREOF

(71) Applicant: LIGHTRIVER TECHNOLOGIES, INC., Concord, CA (US)

(72) Inventors: Daniel W. Rose, Red Bank, NJ (US); Alexander Xie, Newark, NJ (US)

( * ) Notice: Subject to any disclaimer, the term of this patent is extended or adjusted under 35 U.S.C. 154(b) by 0 days.

(21) Appl. No.: 19/244,935

(22) Filed: Jun. 20, 2025

(51) Int. Cl.
*G06N 5/01* (2023.01)
(52) U.S. Cl.
CPC ..................................... *G06N 5/01* (2023.01)
(58) Field of Classification Search
CPC ....................................................... G06N 5/01
See application file for complete search history.

(56) References Cited

U.S. PATENT DOCUMENTS

2015/0006543 A1* 1/2015 Jin ........................ G06F 16/21
                                            707/748
2016/0092535 A1* 3/2016 Kuchibhotla ....... G06F 3/04842
                                            707/634
2019/0297055 A1* 9/2019 May ..................... G06F 21/577
2025/0097237 A1* 3/2025 Parla ................... H04L 63/1433
2025/0098634 A1* 3/2025 Russek-Sobol ...... A01K 29/005
2025/0150328 A1* 5/2025 Vasseur .............. H04L 41/0636
2025/0224944 A1* 7/2025 Kavuri ..................... G06F 8/30
2025/0225008 A1* 7/2025 Dotan-Cohen ..... G06F 16/9038
2025/0247108 A1* 7/2025 Cooper .............. H03M 7/6005

FOREIGN PATENT DOCUMENTS

CN            119003729 A  * 11/2024  ............. G06F 40/30

* cited by examiner

*Primary Examiner* — Tony Wu
(74) *Attorney, Agent, or Firm* — Sterne, Kessler, Goldstein & Fox P.L.L.C.

(57) ABSTRACT

This disclosure provides a method and system for constructing queries using Retrieval Augmented Generation (RAG) to enhance human interaction with technology. This system leverages RAG and large language models (LLM) to analyze multi-source data, enabling the precise construction of structured queries. By integrating multiple sources of truth from various backend and application components, the system ensures accurate and comprehensive responses to user inquiries. The technology empowers users to interact naturally with complex data environments through intuitive query formation, fostering efficient information retrieval and seamless human technology interaction.

19 Claims, 4 Drawing Sheets

300

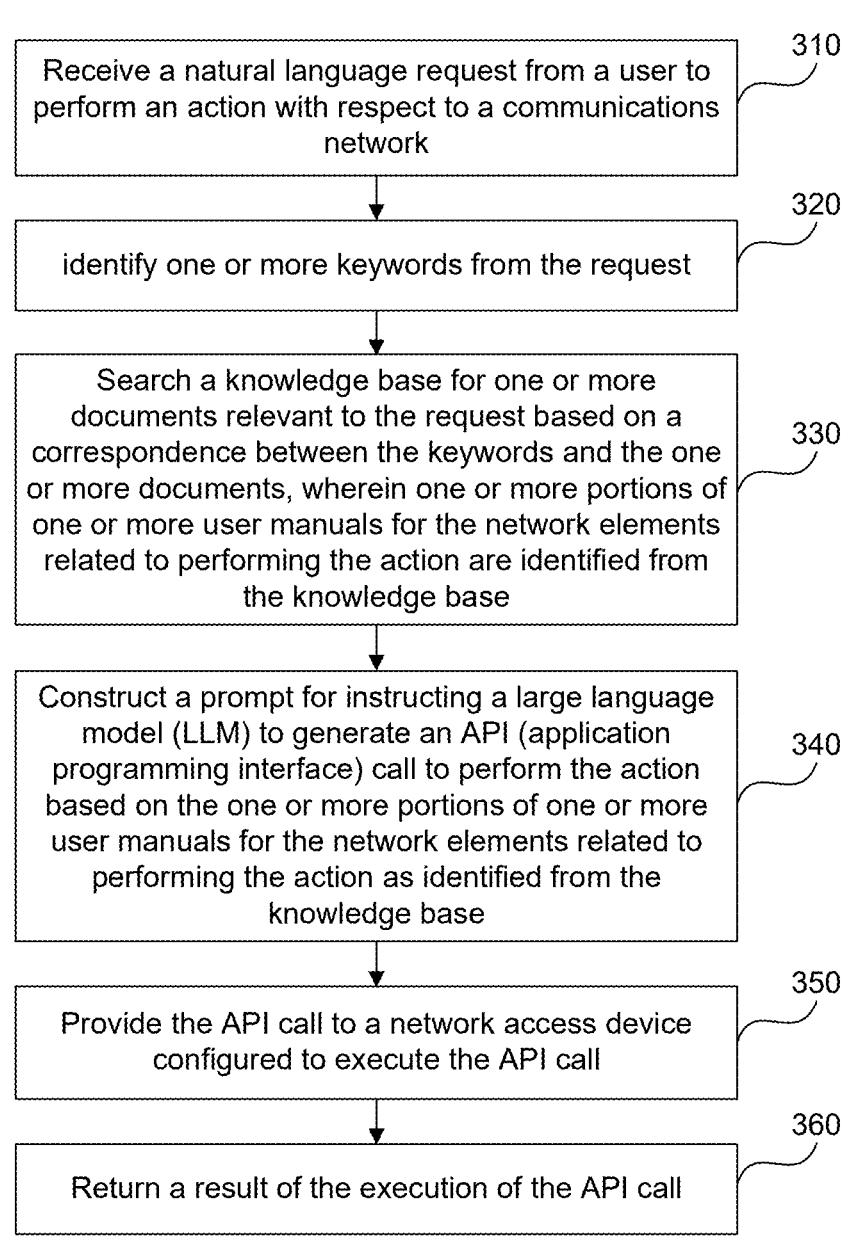

Receive a natural language request from a user to perform an action with respect to a communications network — 310 identify one or more keywords from the request — 320

Search a knowledge base for one or more documents relevant to the request based on a correspondence between the keywords and the one or more documents, wherein one or more portions of one or more user manuals for the network elements related to performing the action are identified from the knowledge base — 330

Construct a prompt for instructing a large language model (LLM) to generate an API (application programming interface) call to perform the action based on the one or more portions of one or more user manuals for the network elements related to performing the action as identified from the knowledge base — 340

Provide the API call to a network access device configured to execute the API call — 350

Return a result of the execution of the API call — 360

FIG. 3

Computer System 400

METHOD AND SYSTEM FOR NETWORK QUERY CONSTRUCTION USING RETRIEVAL-AUGMENTED GENERATION (RAG), AND APPLICATIONS THEREOF

FIELD OF INVENTION

The present disclosure relates generally to constructing network queries using retrieval-augmented generation (RAG), which may modify the operations of network devices.

BACKGROUND

Provisioning network capabilities is a complicated process that requires expertise across varying systems, varying vendors, and varying devices. For example, a communications network connecting two different cities may use different devices, across different vendors; and these devices may be serving many different clients. For a user to provision or request access to reserve a portion of this network so that the user may send data, requires communication and coordination across these varied technological systems and devices. There is no simple way for a user to provision network capabilities, because of the many different devices and variables involved.

BRIEF SUMMARY

According to one or more aspects a natural language request is received from a user to perform an action with respect to a communications network. One or more keywords are identified from the request. A knowledge base is searched for one or more documents relevant to the request based on a correspondence between the keywords and the one or more documents. One or more portions of one or more user manuals for the network elements related to performing the action are identified from the knowledge base. A prompt for instructing a large language model (LLM) to generate an API (application programming interface) call to perform the action is generated based on the one or more portions of one or more user manuals for the network elements related to performing the action as identified from the knowledge base. The API call is provided to a network access device configured to execute the API call, and a result of the execution of the API call is returned.

BRIEF DESCRIPTION OF THE DRAWINGS

The accompanying drawings are incorporated herein and form a part of the specification.

FIG. 3 is a flowchart illustrating example operations for providing by a network action system (NAS), according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provisioning network capabilities is a complicated process that requires expertise across varying systems, varying vendors, and varying devices. For example, a communications network connecting two different cities may use different devices, including legacy devices, across different vendors; and these devices may be serving many different clients. For a user to provision or request access to reserve a portion of this network so that the user may send data, requires communication and coordination across these varied technological systems and devices. There is no simple way for a user to provision network capabilities, because of the many different devices and variables involved.

At least in part to deal with these challenges, this disclosure provides a method and system for constructing queries using Retrieval Augmented Generation (RAG) to enhance human interaction with technology. This system leverages RAG and large language models (LLM) to analyze multi-source data, enabling the precise construction of structured queries. By integrating multiple sources of truth from various backend and application components, the system ensures accurate and comprehensive responses to user inquiries. The technology empowers users to interact naturally with complex data environments through intuitive query formation, fostering efficient information retrieval and seamless human technology interaction.

Figure 1:
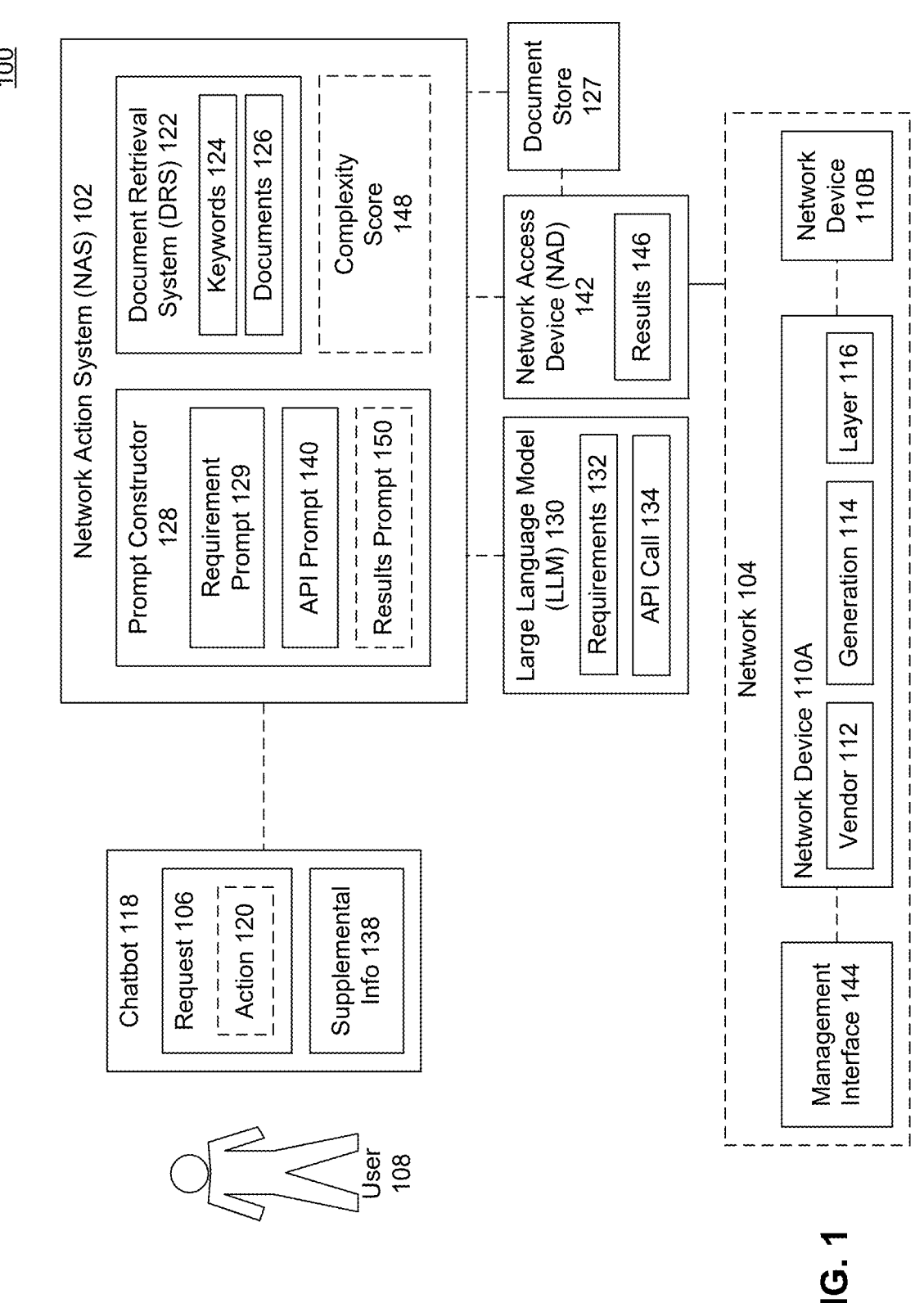
FIG. 1 is a block diagram illustrating example functionality for a network action system (NAS), according to some embodiments.

FIG. 1 is a block diagram 100 illustrating example functionality for a network action system (NAS) 102, according to some embodiments. NAS 102 may modify the operations of a network 104 based on a request 106 to perform an action 120, as received from a user 108. These network modification operations or actions 120 may include provisioning usage of one or more network devices 110A-B, requesting bandwidth from the network 104 to transmit data from a first location to a second location, deprovisioning previously provisioned or allocated network bandwidth, configuring one or more of the network devices 110A-B, as well as performing other operations affecting the performance or operations of one or more network devices 110. Other operations that may be performed, that may or may not impact the operations of the equipment of network 104, include, but are not limited to: network planning, generating executive dashboards, and proactive maintenance activities.

There are many challenges with performing network modification operations (e.g., actions 120), including managing the communication with and coordination amongst the various network devices 110A-B that make up the network 104. For example, often times different network devices 110 will have different communication protocols based in the variations in vendor 112, generation 114, and/or layer 116. It can also be that two network devices 110 from the same vendor 112 will utilize two different communication protocols. For simplicity, only two network devices 110A-B are illustrated, but it is understood that network 104 may any number of devices or network elements. Network devices 110A-B may be referred to herein generally as network device 110 or network devices 110.

Network 104 may include any communications or telecommunications network that connects two or more geographic locations, through which data (e.g., including voice, Internet, streaming, etc.) may be transmit between different computing devices, computing nodes, network elements, or locations. In some embodiments, the actual data transmittal functionalities of network 104 may be performed by any number of interconnected network devices 110. In some embodiments, network 104 may include an optical network and the network devices 110 may include switches or routers that comprise the optical network, whose operations are modified in accordance with a requested action 120.

Each network device 110 may have its own configuration or specifications, including its own unique combination of vendor 112, generation 114, and layer 116, which will be discussed in greater detail below. And the various network devices 110, comprising a network 104, may span across different vendors 112, generations 114, and layers 116. In some embodiments, each unique combination of vendor 112, generation 114, and layer 116 may include its own unique communications protocols, communications interface, or application programming interface (API) by which NAS 102 may interact and communicate with the network device 110. In some embodiments, NAS 102 may manage and coordinate the communications and interactions across these varied multi-vendor, multi-generational, multi-layer network devices 110 in performing an action 120 requested by the user 108.

Oftentimes an action 120 will require the modification of the operations of multiple different network devices 110 across different vendors 112, generations 114, and/or layers 116 which is a technically complex process requiring management and coordination amongst the impacted network devices 110 using their own unique communications protocols and APIs.

In some embodiments, a chatbot 118 may provide a communications interface between NAS 102 and a user 108. Chatbot 118 may include a computer program that is designed to simulate a conversation with a human user 108. Chatbot 118 may include any interface that enables a user 108 to access chatbot functionality or interact with another computing system, such as NAS 102. In some embodiments, chatbot 118 may be accessible via the internet (e.g., through a website), a messaging application (including textual and/or audio communications), or any add-on messaging service that enables two-way communications. Chatbot 118 may allow user 108 to speak and/or type natural language input, which may be received as request 106. The natural language input by user 108 may include normal speaking/writing language (e.g., as opposed to requiring the user 108 to communicate through any particular communication protocols or programming language). In some embodiments, chatbot 118 may accept input from other non-human sources, such as other computing systems or artificial intelligence systems. In these embodiments, data may not be formatted in natural language, but may instead be formatted in some other machine-readable format, such as a JSON or XML format.

Request 106 may include any input provided by the user 108 to chatbot 118, in which the user 108 is requesting or commanding the performance of one or more actions 120, or providing information related to the performance of an action 120. As described herein, request 106 may include a command by user 108 to perform an action 120 with respect to network 104. Action 120 can include any action or combination of actions that modify the operations of at least a portion of network 104 and/or one or more network devices 110. As noted above, action 120 may include, provisioning actions, deprovisioning actions, and configuration actions.

In some embodiments, action 120 may include checking on the status of a network device 110, or setting an alarm for one or more network devices 110. The alarm may cause NAS 102 to provide the user 108 with a notification or perform some action 120 when the usage rate or performance of a network device 110 falls below or rises above a certain threshold.

For simplicity, as described herein, action 120 will primarily focus on a provisioning action in which the user 108 wants to reserve a portion of bandwidth from network 104 to transmit data from one location (e.g., computing device, network element, node, or network device 110) to another location. For example, chatbot 118 may receive a request 106 from user 108, such as "I want to provision a 100 GB wavelength between Wash, DC and Philadelphia". In some embodiments, chatbot 118 may transmit the request 106 to NAS 102 for additional processing.

In some embodiments, chatbot 118 may provide request 106 to a document retrieval system (DRS) 122. In some embodiments, DRS 122 may include natural language processing (NLP) capabilities that may process request 106, including identifying the action 120 being requested by the user 108. In some embodiments, DRS 122 may identify one or more keywords 124 from request 106.

The keywords 124 may include a set of one or more words or phrases that indicate the substance of what action 120 the user 108 is requesting and any information related to the performance of that action 120. In some embodiments, the keywords 124 may include substantive words and phrases from request 106, with non-substantive or connective words being removed or stripped away. In continuing the example above, of request 106 "I want to provision a 100 GB wavelength between Wash, DC and Philadelphia", the keywords 124 may include: provision, 100 GB, wavelength, Wash, DC, Philadelphia. In some embodiments, the keywords 124 may correspond to the subjects and/or objects identified in the request 106.

In some embodiments, certain words identified in request 106 may be spell-checked or replaced with more accurate words pertaining to networks. For example, if the request read "I want to provolision a 100 GB wave between Wash, D C and Philadelphia," DRS 122 may change "provolision" to "provision" and "wave" to "wavelength". In some embodiments, DRS 122 may return a corrected request to user 108 via chatbot 118 to confirm the corrected request is correct, or confirm any ambiguous information in the request 106. For example, if the request 106 indicated the city "Springfield", DRS 122 may determine that "Springfield" is ambiguous and request a clarification as to which state, since many different states include the city Springfield.

In some embodiments, DRS 122 may perform a vector search on the documents of a document store 127 using the keywords 124 extracted or identified from request 106. In some embodiments, documents may include user manuals, technical write-ups, blogs, API specifications, social media posts, and other material regarding the various network devices 110, across different vendors 112, generations 114, and layers 116. In some embodiments, the documents may include manuals and documents for older versions (e.g., previous generations 114) of network devices 110 that are no longer in production or supported by a vendor 112 of the network device 110, but which may still be used on one or more portions of network 104 or to provide some portion of network functionality. In some embodiments, the knowledge base or knowledge store 127 may be searched for one or more documents relevant to the request 106, based on a correspondence between the keywords 124 and the one or more documents stored in the knowledge store 127. From the knowledge store 127 one or more user manuals for the network elements or network devices 110 related to performing the action 120 may be identified.

In some embodiments, NAD 142 may manage or add documents to the document store 127. In some embodiments, NAD 142 may periodically receive or ping network 104 and/or network devices 110 for status updates, network configurations, network maps, or otherwise receive or generate documents related to the (real-time) operational characteristics of network 104 and/or one or more network devices 110. These operational documents related to network 104 may be stored in document store 127, and may be provided to LLM 130 as part of documents 126, to whatever extent they are related to performing action 120. In some embodiments, these operational documents retrieved, received and/or otherwise generated by NAD 142 may provide LLM 130 with greater information with regards to what network devices 110 may be involved in performing action 120. In some embodiments, when network 104 and/or network devices 110 are updated, these operational documents may be updated accordingly. In some embodiments, in addition to, or in lieu of adding documents to the document store 127, the NAD 142 may be queried for information or data regarding the operational status of network devices 110 and/or network 104.

In some embodiments, DRS 122 may calculate a similarity score between keywords 124 and the text of the documents stored in document store 127. In various embodiments, the similarity score may include or be based on a text similarity and/or a semantic similarity. Text similarity is a degree of similarity between the text, whereas semantic similarity is a degree of similarity of the meaning of the text. For example "computer" and "computing" may share a text similarity, while "computer" and "laptop" may include semantic similarity. The similarity score may be performed using Euclidean distance, Cosine distance, Manhattan distance, Jaccard distance, or Mahalanobis distance, or any other similarity scoring system which may measure the similarity between the keywords 124 and each evaluated document of document store 127.

Documents 126 may represent the highest scoring documents of document store 127 that are most closely related to the keywords 124, which may be returned as a result of the vector search (e.g., with the highest similarity score). In some embodiment, the highest scoring documents 126 may be re-ranked or reordered with the most relevant documents being first using a ranking algorithm. In some embodiments, the ranking algorithm may use LLM 130 to assess co-similarity between the documents and/or a similarity between context from the query or request 106 and each of the respective documents. In some embodiments, the documents 126 may include only the ten most relevant documents, after the re-ranking, or only those documents with a similarity score greater than a threshold. In some embodiments, a first threshold may be applied to the similarity score, to identify the highest scoring documents, and a second threshold may be applied to the ranking algorithm, to identify the highest ranking documents (e.g., top five or 10 documents). In some embodiments, documents 126 may include a list of documents, pointers to documents, or portions of documents which are identified as being relevant to performing action 120, based on the vector search or similarity scoring between keywords 124 and the contents of documents store 127.

For example, one of the documents of document store 127 that is deemed similar to request 106 based on the keywords 124 may include a 128-page user manual on how to configure the operations of network device 110A. However, of the 128 pages, DRS 122 may determine, based on the similarity search, that only the content on pages 43-44 may be relevant to the particular action 120 associated with the request 106. As such, documents 126 may include an excerpt of the full user manual or a pointer to pages 43-44 of the user manual, rather than all 128 pages. In some embodiments, the user manual may include documentation published by vendor 112 of network device 110A, detailing operating instructions for the network device 110A.

One of the benefits of using the approach described herein is that there is no need to send to send network data (and other sensitive info) directly to an LLM 130. In some embodiments, DRS 122 may filter the documents 126 provided to LLM 130, to prevent any sensitive information from being provided to LLM 130. Then, for example, the provided documents 126, LLM 130 may be used to construct API calls 134 as described herein.

In some embodiments, a prompt constructor 128 may build or construct one or more prompts for LLM 130 to perform some functionality, including generating some form of output in response to the prompt. A prompt may include one or more lines of text organized across one or more documents that is particularly formatted to by understandable by a large language model (LLM) 130. LLM 130 may include a multimodal model that is able to accept as input and provide as output other types of data beyond natural language. For example, LLM 130 may accept images as input. For example, it may be useful to provide a screenshot to the model to provide additional context to support what the user is viewing. LLM 130 may include an artificial intelligence, machine learning, or deep learning model that is configured to execute data processing commands from plain-text (e.g., not requiring computer language or coded input). LLM 130 can understand, generate, and manipulate human language. LLM 130 may be trained on vast amounts of text data. LLM 130 may use deep learning techniques—particularly transformer architectures—to recognize patterns in language and predict what comes next in a sequence of words. This allows it to perform a wide range of language-based tasks, such as answering questions, writing essays, summarizing text, translating languages, coding, and even engaging in conversation. LLM 130 may include any computing system that is configured to perform processing tasks based on text-based or plain language inputs. LLM 130 may be configured to create original content from one or more documents or input in accordance with a prompt. In some embodiments, LLM 130 may include a generative pre-training transformer (GPT). In some embodiments, LLM 130 may include a state space model (SSM) that describes how an internal state of a system evolves over time.

In some embodiments, the functionality described herein may be achieved through a single prompt for LLM 130. However, for simplicity and clarity, as described herein, the utilization and functionality of LLM 130 will be described with regards to prompt constructor 128 constructing multiple, different prompts. These example prompts include a requirements prompt 129, an API prompt 140, and a results prompt 150. In other embodiments, different or additional prompts may be constructed.

In some embodiments, the requirements prompt 129 may cause LLM 130 to identify what information is necessary (and optional) to generate an API call 134 to perform action 120, this information may be referred to herein as requirements 132. In some embodiments, the requirements prompt 129 may include or reference the documents 126. As noted above, the documents 126 may be a subset of documents or portions of documents from document store 127 which have been identified as being relevant to action 120 by DRS 122.

In some embodiments, the requirements prompt 129 may include instructions limiting the LLM 130 to only using the documents 126. In some embodiments, the requirements prompt 129 may include instructions for LLM 130 to primarily rely on the documents 126, in generating a set of requirements 132 to fulfill request 106 (which may be provided with requirements prompt 129).

This limiting of the corpus of information available to LLM 130 to the documents 126 may result in both faster processing in generating requirements 132 (e.g., based on a smaller corpus of documents 126) and more accurate results (e.g., because irrelevant documents are excluded from the subset of documents 126). Also, because many of the documents 126 may be user manuals, this may also produce more user-friendly output. LLM 130 may process the documents 126 to generate a set of requirements 132 that indicates what information is required and/or may be optionally provided by user 108 in performing action 120.

As an example, the provisioning of a wavelength (e.g., action 120) may require communications and coordination amongst four different types of network devices 110, each with their own unique configurations (e.g., vendor, generation 114, layer 116) and manner of communications or API. Then, for example, LLM 130 may generate a single set of requirements 132 for all four network devices 110 determining what information needs to be provided by the user 108 to complete the provisioning of the network devices 110 involved in performing action 120.

In some embodiments, the requirements 132 may be provided back to NAS 102. In some embodiments, prompt constructor 128 may construct an API prompt 140 instructing LLM 130 to generate an API call 134 based on request 106 and requirements 132. In some embodiments, the API prompt 140 may grant the LLM 130 permission or authorization to gather any additional necessary or supplemental information 138 from user 108 through chatbot 118.

In some embodiments, LLM 130 may initially compare what information was received as part of request 106 to requirements 132 to determine whether the information of request 106 is sufficient to fulfill requirements 132, or whether there is any required or optional information missing. In continuing the example above, request 106 was "I want to provision a 100 GB wavelength between Wash, DC and Philadelphia". LLM 130 may have generated a set of requirements 132 for a provisioning action which indicate that the required information is: what is provisioned, quantity of provision, starting location, ending location, and a priority indicator. LLM 130 may further determine, as part of requirements 132, that a user 108 may optionally provide a list of any nodes that are to be included or excluded in the provisioning request.

In some embodiments, LLM 130 may communicate with user 108, through chatbot 118. For example, LLM 130 may include a direct connection to chatbot 118 or communicate through a particular window or interface managed or provided by chatbot 118. LLM 130 may request supplemental information 138 from the user 108. The supplemental information 138 may include any required and/or optional information requested by LLM 130. In some embodiments, the requirements prompt 129 may cause LLM 130 to first request the required information that is still needed. Then, for example, when the required information has all been received, LLM 130 may notify user 108 that the required information has all been received. Then, for example, LLM 130 may, through chatbot 118, prompt user for any optional information. Any information received from the user 108 after the initial request 106, may be supplemental information 138.

In some embodiments, the receipt of new or supplemental information 138 may cause NAS 102 to retrieve new, additional, or replacement documents 126 from the document store 127. For example, the user 108 may provide additional details as supplemental information 138 that renders a previously selected document as being less relevant and another document that was not selected as being more relevant. In some embodiments, the receipt of supplemental information 138 may trigger this loop of retrieving new documents 126 from the document store 127. In other embodiments, supplemental information 127 may not trigger any new document loop, and processing may continue based on the previously identified set of documents 126.

In some embodiments, each time the user 108 provides supplemental information 138, LLM 130 may compare the supplemental information 138 to the requirements 132 to determine if all of the required information has been received and whether the user 108 has been prompted and provided or declined to provide the optional information. This back-and-forth interaction between LLM 130 and user 108 through chatbot 118 may continue until all of the required information of requirements 132 is received (or the user 108 cancels the request 106). Upon receiving all the require information and whatever optional information the user 108 as provided as supplement info 138 (if any was necessary), LLM 130 may generate API call 134.

For simplicity, only a single API call 134 is illustrated, however it is understood that API call 134 may include multiple different API calls 134 that are to be executed across one or more different network devices 110 in performing action 120. In some embodiments, the API calls 134 may need to be performed or executed in a particular order. The API call 134 may include one or more lines of computing code or instruction that is formatted to directly or indirectly change the operations of one or more of the network devices 110. In some embodiments, API call 134 may include multiple different lines of code, each formatted to operate with a different API and/or a network device 110. In some embodiments, API call 134 may include multiple API calls 134, and each API call 134 may be configured based on the vendor 112, generation 114, and layer 116.

Vendor 112 may be the name of a company, manufacturer, make of a network device 110. Some example vendors 112 include, but are not limited to, Ciena, Fujitsu, Nokia, Google, and Cisco. Generation 114 may indicate the model of a device, the firmware version, software version, year of production, or other technical features or aspects of the network device 110. Some example generations 114 include, but are not limited to, SONET (synchronous optical network), OTN (optical transport network), SDH (synchronous digital hierarchy), and DWDM (dense wavelength division multiplexing). Layer 116 may indicate on which network layer the particular network device 110 operates.

In some embodiments, network 104 may be a communications network, such as an optical transport network, and network devices 110 may include optical switches that provide for data communications through the network 104. In some embodiments, examples of layer 116 may include OSI (Open Systems Interconnection) network layers. The OSI divides the communication process into seven distinct layers: 1) Physical, which handles the transmission of raw data bits over a physical medium; 2) Data Link, responsible for node-to-node data transfer and error detection; 3) Network, which determines how data is routed between devices across networks (e.g., using IP addresses); 4) Transport, ensuring complete data transfer with reliability (like TCP); 5) Session, which manages connections and sessions between applications; 6) Presentation, translating data formats and encrypting/decrypting information for the application; and 7) Application, where users interact with the network through software like browsers and email clients. In various embodiments, network devices 110 may include devices operating at layers 1, 2, 3, or any combination thereof. NAS 102 may provide for communication and coordination amongst the various different network devices 110 which may include network devices 110 across different vendors 112, generations 114, and layers 116 to perform one or more actions 120.

In some embodiments, API call 134 may include multiple different API calls 134 which are needed to communicate and coordinate amongst the varying network devices 110, and their varied multi-vendor, multi-generational, and multi-layer configurations and specifications. As an example, an API call 134 may be: POST/papi/provisioning/wavelength?a_end_tid=CIENA-6500-542.MD&z_end_tid=NOKIA-1830-PSS-747.PA&route=route1&path=path2. This example API call 134 may include information such as the name of a vendor 112, the generations 114, the names of data routes within network 104, and other information needed to perform action 120.

In some embodiments, a network access device (NAD) 142 may execute or cause the execution of the API call(s) 134, in their required order (if any). NAD 142 may include a computing system or interface that is configured to communicate directly and/or indirectly with the various network devices 110, causing or requesting the execution of API call 134. In some embodiments, NAD 142 may perform authentication on any systems or devices providing commands (e.g. API calls 134) to the NAD 142, prior to execute. NAD 142 may reject (and/or report) attempts to perform commands by unauthorized systems or users. In some embodiments, NAD 142 may be configured to be able to execute any authorized and received API calls 134, from NAS 102 and/or LLM 130.

In some embodiments, LLM 130 may return the generated API call(s) 134 to NAS 102 which provides the API call 134 to NAD 142, and NAS 102 may operate as an intermediary for communications between LLM 130 and NAD 142. In some embodiments, LLM 130 and NAD 142 may communicate directly with one another. For example, LLM 130 may provide a request to NAD 142 to please execute "GET/papi/provisioning/routes?a_end_vendor-ciena&z_end_vendor=nokia&gbps=100". NAD 142 may be able to understand how to execute this API call 134, and may cause the execution of the API call 134 on the network devices 110 of network 104. In some embodiments, NAD 142 may provide an additional layer of security, preventing LLM 130 from having direct access to network 104 or any network devices 110. In some embodiments, NAD 142 may be able to ignore or report any invalid or unauthorized requests or API calls 134 received from LLM 130.

In some embodiments, NAD 142 may communicate with a network device 110 indirectly through a management interface 144. Management interface 144 may include a computing interface through which one or more network devices 110 may be communicated with, interacted with, or the operations of which may be configured. In some embodiments, the management interface 144 may span across different vendors 112. In some embodiments, a management interface 144 may be managed by a vendor 112 of those network devices 110 accessible via the management interface 144.

For example, network 104 may include six network devices 110. Of the six network devices 110, three may be built or managed by vendor A (e.g., vendor 112), two may be built or managed by vendor B, and one may be built by vendor C. In this example, vendor A may provide a management interface 144 for managing the operations of their three network devices 110. Then, for example, in executing an API call 134 against any of the three devices of vendor A, NAD 142 may communicate the API call 134 to the vendor A management interface 144 which would then directly communicate and execute the API call 134 on the affected network device(s) 110. A similar scenario may be applicable for the two network devices 110 of vendor B. In some embodiments, vendor C may not have a management interface 144 or the network device 110 of vendor C may be an unsupported legacy device. Then, for example, NAD 142 may communicate directly with this network device 110 and request or cause the execution of the API call 139 by interacting with the vendor C network device, rather than through a management interface 144.

For simplicity, only a single management interface 144 connected to a network device 110 is illustrated. However, it is understood that in other embodiments, any number of management interfaces 144 may be connected to any number of network devices 110 across network 104. Network 104 may also include one or more network devices 110 not connected to any management interface 144, which NAD 142 communicates with directly.

In some embodiments, a vendor 112 may stop supporting a legacy network device 110 or a previous generation 114 of a network device 110, and the communications with that older version network device 110 may no longer be supported by or accessible through a management interface 144. However, the legacy network device 110 may still be in use or operational as part of network 104, and may be need to communicated with as part of performing action 120. In some embodiments, NAD 142 may communicate directly with these unsupported network devices 110 or communicate with these unsupported network devices 110 though a vendor-agnostic management interface 144.

In some embodiments, upon receiving API call(s) 134, NAD 142 may distribute and execute the API call(s) 134 to the corresponding management interface 144 and/or network device 110. As these API call(s) 134 are executed across the different network device(s) 110, each API call 134 may return a result 146. The result 146 may include a result (e.g. success or failure) of the execution of the API call 134, or the result of executing API call(s) 134 against a particular network device 110. For example, result 146 may include: Device 1 (successful), Device 2 (successful), Device 3 (successful).

In some embodiments, NAD 142 may aggregate the results 146 from the management interface(s) 144 and network devices 110 and continue to wait until results from all the API calls 134 are received (e.g., which may include a timeout period if no result is received within a time threshold). For example, result 146, as provided to the user 108 may include: "Operation Successful" or "Operation Failure at Device 2". In some embodiments, the real-time results 146 may be communicated to the user 108 as they are received. For example, result 146 may indicate: API call 1 (successful), API call 2 (successful), API call 3 (failure), API call 4 (successful).

In some embodiments, the results 146 may be technically complex and difficult to understand by a user 108, particularly if there are multiple API calls 134 executed across many different network devices 110. In some embodiments, NAS 102 may compute a complexity threshold or complexity score 148. Complexity score 148 may be an indication or determination as to whether the result(s) 146 are to be aggregated or simplified before being presented to the user 108.

In some embodiments, NAS 102 may calculate the complexity score 148 may be based on how many API calls 134 are being executed and/or how many network devices 110 are involved in performing the action 120. In some embodiments, the complexity score 148 may be based on how many different vendors 112, generations 114, and/or layers 116 are involved in performing the action 120. The greater the number of API calls 134, network devices 110, vendors 112, generations 114, and layers 116, the greater the value of complexity score 148. In some embodiments, complexity score 148 may be valued between 1-100, and any complexity score 148 greater than a threshold (e.g., 60) may be considered complex, and NAS 102 may utilize LLM 130 to generate simplified result for the user 108.

In some embodiments, the complexity score 148 may indicate that if there are more than a threshold number of API calls 134, then NAS 102 may determine that the results 146 will be too complicated to be presented to the user 108 directly, and are to be simplified before being returned to a user 108. Or for example, a particular action 120 (e.g., such as a provisioning action) may always be simplified before returning the result 146 to the user 108. In some embodiments, the complexity score 148 may correspond to a role of the user 108. For example, a business user may indicate that the results 146 should be simplified by LLM 130, while a developer or administrator user may indicate that the results 146 may be directly communicated from NAD 142 to user 108 through chatbot 118.

In some embodiments, if the complexity score 148 is greater than a threshold, then, prompt constructor 128 may construct a results prompt 150, and NAD 142 may return results to NAS 102. The results prompt 150 may include the result(s) 146 as received by NAD 142 from executing the API calls 134, and may instruct or cause LLM 130 to generate a user-friendly output describing whether or not the performance of the action 120 (as indicated by the results 146 of the execution of the API call(s) 134) was successful. In some embodiments, this may include simplifying or translating any error codes or error information returned in any of the results 146 (e.g., which may be determined based on documents 126), or simply outputting a single success notification for a successful performance of the action 120, rather than multiple success notifications for each API call 134. In other embodiments, the NAD 142 may communicate the results 146 directly to the user 108.

If the result 146 was successful, the user 108 may then have access to the provisioned wavelength or network capabilities requested, or the operations of one or more network devices 110 would have been changed or adjusted in accordance with action 120.

Figure 2:
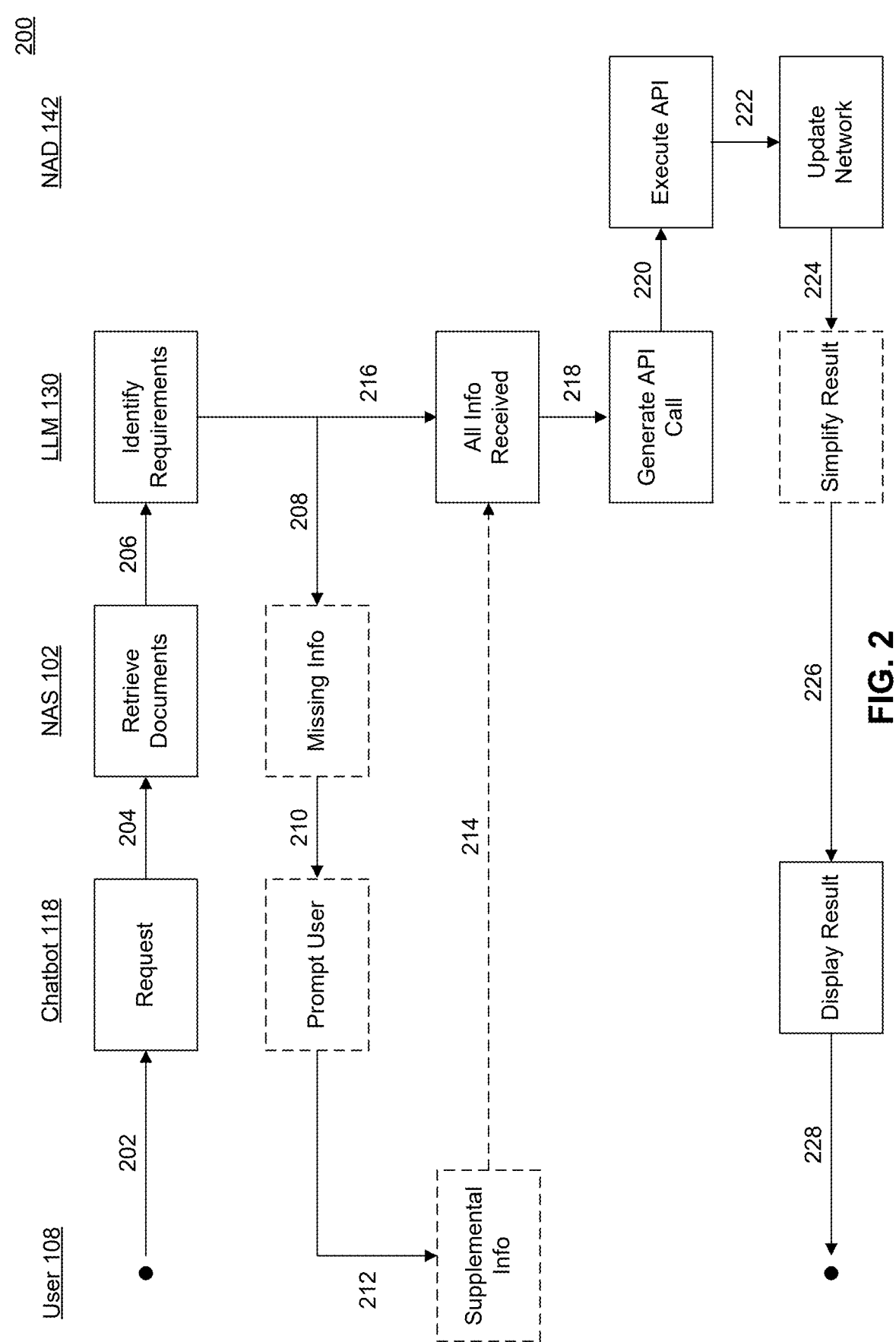
FIG. 2 is a flowchart illustrating example operations for performing an action by a network action system (NAS), according to some embodiments.

FIG. 2 is a flowchart 200 illustrating example operations for performing an action 120 by a network action system (NAS) 102, according to some embodiments. Method 200 shall be described, in part, with reference to FIG. 1.

At 202, a user 108 may submit a request by speaking or typing the natural language request into the interface of a chatbot 118. The chatbot 118 may receive the request, and at 204 provide the request to NAS 102 to retrieve documents related to the request. In some embodiments, DRS 122 may identify keywords 124 from the request 106 and retrieve documents 126 from a document store 127. The documents 126 may include identified portions of documents, such as user manuals across different network devices 110, different vendors 112, different generations 114, and different layers 116, that are relevant to performing the action 120 based on a correspondence to the keywords 124.

At 206, LLM 130 may identify the information is required to generate each of one or more API calls 134 that may be necessary to perform an action 120 requested by the user 108 based on the documents 126 (including the relevant portions of documents) identified by DRS 122. These identified requirements 132 that may span across different network devices 110 (including different vendors 112, different generations 114, and different layers 116) may be identified based on LLM 130 analyzing the identified documents 126.

As described above, in some embodiments, the requested action 120 may be a request to provision a portion of the network 104 to send data between different nodes, network elements, locations, or network devices 110. At 206, LLM 130 may have compared the request 106 to the requirements 132 across the different network devices 110 and determined that there is some missing information that the user 108 did not provide as part of the original request 106. The missing information could include required information that is necessary to perform the action 120. In some embodiments, the missing information may include optional information that could be provided by a user 108 that was not provided as part of the original request 106. At 210, the chatbot 118 may prompt the user 108 to provide supplemental information 138, which may include additional required information and/or the option to provide additional optional information.

If the only missing information is optional information, then the subsequent information 138 may either include whatever portion of the optional information the user 108 wants to provide, or an indication by the user 108 that they prefer not to provide the optional information.

In generating the requirements 132, NAS 102 may have already accounted for the varied required and optional information across the different APIs that would be needed to communicate with the various network devices 110 involved in performing the action 120. In some embodiments, the various network devices 110 involved in performing the action may be identified based on the documents 126.

In some embodiments, a single piece of supplemental information 138 may be used to fulfill the requirements 132 across different APIs, thus avoiding asking the user 108 to provide the same information over and over again. In some embodiments, NAS 102 may systematically ask the user 108 for supplemental information 138 one API at a time, until all the requirements 132 across all the APIs have been fulfilled between the request 106 and the supplemental info 138.

At 216, if there was no missing information in the request 106, or upon receiving the supplemental information 138 (if any), and all of the information has been received, then at 218, LLM 130 may generate one or more API calls 134 that are required to perform at least a portion of the action 120. As noted above, API call 134 may include multiple different API calls 134 compatible with different network devices 110 across different vendors 112, generations 114, and/or layers 116.

At 220, LLM 130 may be authorized to communicate directly with NAD 142 and provide the API call(s) 134 to NAD 142 to execute. In some embodiments, NAD 142 may directly communicate with some network devices 110 and may indirectly communicate with other network devices 110 through a management interface 144 (e.g., which may be vendor-specific or vendor-agnostic). Through direct and/or indirect communications, NAD 142 may cause or request the execution of the API call(s) 134, and receive a result 146 from each execution, which may be required to happen in a particular order. At 222, through the execution of the API call(s) 134, the operations of one or more network devices 110 may be modified, and a result 146 returned to NAD 142. In some embodiments, if any result 146 indicates that there was a failure, then NAD 142 may request a rollback of any successful API calls, and generate a failure result.

At 224, in some embodiments, the result 146 may be simplified to be user friendly based on a complexity score 148. For example, if there are more than three different API calls 134 which return results 146 that indicate success, in some embodiments, NAS 102 may leverage LLM 130 to simplify these results 146 to make them more user-friendly through a results prompt 150. And either the original result(s) 146 received from the execution of the API calls 134 and/or the simplified result may be displayed by the chatbot 118 for the user 108. A successful execution of any API call 134 may result in the modification of the operations of one or more network devices 110 in accordance with performing action 120.

FIG. 3 is a flowchart 300 illustrating example operations for providing by a network action system (NAS) 102, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1.

In 310, a natural language request is received from a user to perform an action with respect to a communications network. For example, user 108 may speak or type input into an interface of a chatbot 118, requesting a network action 120 to be performed. The action 120 may include any action that effects the functioning or performance of one or more network devices 110 of network 104. As noted above, in some embodiments, the request 106 may be received from another computing system in a machine-readable format, such as JSON or XML.

In 320, one or more keywords are identified from the request. For example, DRS 122 may identify one or more keywords 124 from the request 106. The keywords 124 may include any contextually significant words from request 106. In some embodiments, DRS 122 may include natural language processing capabilities that may be used to identify the keywords 124.

In 330, a knowledge base is searched for one or more documents relevant to the request based on a correspondence between the keywords and the one or more documents, wherein one or more portions of one or more user manuals for the network elements related to performing the action are identified from the knowledge base. For example, DRS 122 may search document store 127 for one or more documents or portions of documents, which may include documentation for different network devices 110, different vendors 112, different generations 114, and different layers 116, which are relevant to performing action 120. In some embodiments, document store 127 may include a network map indicating what network devices 110 are operational on network 104. In some embodiments, the documents of document store 127 may be limited to those documents which correspond to active network devices 110 of network 104. DRS 122 may identify portions of user manuals and other documents, across different network devices 110 (including different vendors 112, generations 114, and layers 116), that are relevant to performing action 120.

In 340, a prompt is constructed for instructing a large language model (LLM) to generate an API (application programming interface) call to perform the action based on the one or more portions of one or more user manuals for the network elements related to performing the action as identified from the knowledge base. For example, prompter constructor 128 may construct one or more prompts for instructing LLM 130 to generate an API call 134 to perform the action 120. From the documents 126, LLM 130 may determine what is the required and/or optional information (e.g., requirements 132) for generating an API call 134, and request any missing or supplemental information 138 from a user 108. LM 130 may then generate one or more API calls 134 which may be executed across different network devices 110 (including different vendors 112, generations 114, and layers 116)

In 350, the API call is provided to a network access device configured to execute the API call. For example, LLM 130 may provide the API call(s) 134 directly or indirectly to NAD 142. NAD 142 may include one or more computing devices or other interfaces which is configured to communicate directly or indirectly with network devices 110. In some embodiments, NAD 142 may be able to retrieve or have access to real-time network device 110 status, availability, or functionality information. In some embodiments, NAD 142 may be able to directly execute API call 134 on a network device 110 through its MAC (media access control) address, or may indirectly execute or request the execution of an API call on a network device 110 through a management interface 144.

In 360, a result of the execution of the API call is returned. For example, NAD 142 may receive a result 146 of the execution of the API calls 134, which may indicate whether or not the operations of the corresponding network devices 110 have been adjusted accordingly. These results 146 may be returned to the user 108 through chatbot 118.

Figure 4:
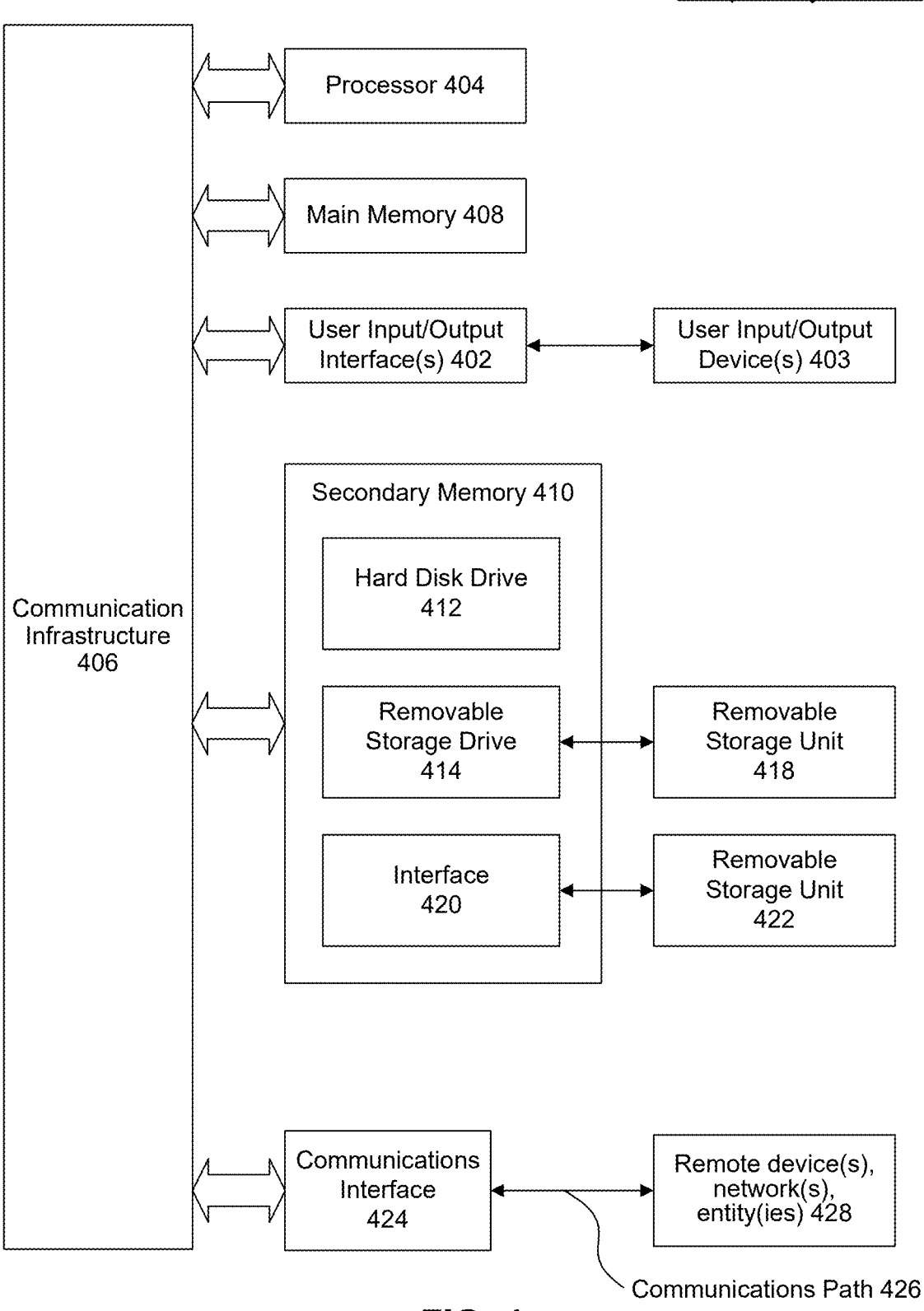
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for intelligently searching disparate technology silos within a communications network including a plurality of network elements from different vendors, comprising:

receiving a request from a user to perform an action with respect to the communications network, wherein the plurality of network elements from the different vendors includes different generations of network devices;

identifying one or more keywords from the request;

searching a knowledge base comprising user manuals for the different generations of network devices for one or more documents relevant to the request based on a correspondence between the keywords and the one or more documents, wherein one or more portions of the user manuals related to performing the action are identified from the knowledge base;

constructing a prompt for instructing a large language model (LLM) to generate an application programming interface (API) call to perform the action based on the one or more portions of the user manuals related to performing the action as identified from the knowledge base;

providing the API call to a network access device configured to execute the API call; and returning a result of the execution of the API call including transmitting the result to the LLM based on a complexity score comprising a number of the different generations of the network devices involved in the API call, wherein the complexity score is greater than or equal to a complexity threshold.

2. The computer-implemented method of claim 1, wherein the LLM is configured to identify a set of required information for generating the API call, and wherein the computer-implemented method further comprises:

identifying information missing from the request based on a comparison of the request to the set of required information; and receiving subsequent input from the user including the information missing from the request, wherein the LLM is configured to generate the API call based at least in part on the subsequent input from the user.

3. The computer-implemented method of claim 1, wherein the action comprises a provisioning action for provisioning both a first network device of the plurality of network elements associated with a first vendor of the different vendors, and a second network device of the plurality of network elements associated with a second vendor of the different vendors, wherein the second network device is a legacy network device that is no longer supported by the second vendor.

4. The computer-implemented method of claim 3, wherein the network access device is configured to cause a provisioning of both the first network device and the second network device.

5. The computer-implemented method of claim 3, wherein the network access device is configured to communicate indirectly with the first network device through a network management system associated with the first vendor, and directly with the second network device.

6. The computer-implemented method of claim 4, wherein the second network device is only available for provisioning through direct communications with the second network device and is not available via a network management system associated with the second vendor.

7. The computer-implemented method of claim 3, wherein a set of required information necessary to generate the API call to perform the action includes required information for both the first network device of the first vendor and the second network device of the second vendor.

8. The computer-implemented method of claim 1, wherein the identifying one or more documents comprises performing a vector search of the one or more documents based on the keywords.

9. The computer-implemented method of claim 1, wherein the API call comprises a plurality of API calls, and wherein the network access device is configured to communicate a first API call of the plurality of API calls to a first network device of the plurality of network elements from a first vendor, and a second API call of the plurality of API calls to a second network device of the plurality of network elements from a second vendor.

10. The computer-implemented method of claim 9, wherein the network access device is configured to communicate directly with the first network device, and communicate indirectly with the second network device through a management interface associated with the second vendor.

11. The computer-implemented method of claim 1, wherein a user-appropriate output comprises translated error codes in the result based at least on the one or more portions of the user manuals corresponding to the different generations of the network devices involved in the API call.

12. The computer-implemented method of claim 1, wherein the returning the result of the execution of the API call comprises transmitting the result to the LLM based at least on a role of the user.

13. The computer-implemented method of claim 1, wherein the returning the result of the execution of the API call comprises:

constructing a results prompt that causes the LLM to generate a user-appropriate output regarding whether the result was successful; and transmitting the results prompt and the result to the LLM.

14. A system comprising:

a memory; and at least one processor coupled to the memory and configured to perform operations comprising:

receiving a request from a user to perform an action with respect to a communications network comprising a plurality of network devices from different vendors including different generations of network devices;

identifying one or more keywords from the request;

searching a knowledge base comprising user manuals for the different generations of network devices for one or more documents relevant to the request based on a correspondence between the keywords and the one or more documents, wherein one or more portions of the user manuals related to performing the action are identified from the knowledge base;

constructing a prompt for instructing a large language model (LLM) to generate an application programming interface (API) call to perform the action based on the one or more portions of the user manuals related to performing the action as identified from the knowledge base;

providing the API call to a network access device configured to execute the API call; and returning a result of the execution of the API call including transmitting the result to the LLM based on a complexity score comprising a number of the different generations of the network devices involved in the API call, wherein the complexity score is greater than or equal to a complexity threshold.

15. The system of claim 14, wherein the LLM is configured to identify a set of required information for generating the API call, and wherein the computer-implemented method further comprises:

identifying information missing from the request based on a comparison of the request to the set of required information; and receiving subsequent input from the user including the information missing from the request, wherein the LLM is configured to generate the API call based at least in part on the subsequent input from the user.

16. The system of claim 14, wherein the action comprises a provisioning action for provisioning both a first network device of the plurality of network devices associated with a first vendor of a plurality of vendors, and a second network device of the plurality of network devices associated with a second vendor of the plurality of vendors.

17. The system of claim 16, wherein the network access device is configured to cause a provisioning of both the first network device and the second network device.

18. A non-transitory computer-readable medium having instructions stored thereon that, when executed by at least one computing device, cause the at least one computing device to perform operations comprising:

receiving a request from a user to perform an action with respect to a communications network comprising a plurality of network devices from different vendors including different generations of network devices;

identifying one or more keywords from the request;

searching a knowledge base comprising user manuals for the different generations of network devices for one or more documents relevant to the request based on a correspondence between the keywords and the one or more documents, wherein one or more portions of the user manuals related to performing the action are identified from the knowledge base;

constructing a prompt for instructing a large language model (LLM) to generate an application programming interface (API) call to perform the action based on the one or more portions of the user manuals related to performing the action as identified from the knowledge base;

providing the API call to a network access device configured to execute the API call; and returning a result of the execution of the API call including transmitting the result to the LLM based on a complexity score comprising a number of the different generations of the network devices involved in the API call, wherein the complexity score is greater than or equal to a complexity threshold.

19. The non-transitory computer-readable medium of claim 18, wherein the LLM is configured to identify a set of required information for generating the API call, and wherein the computer-implemented method further comprises:

identifying information missing from the request based on a comparison of the request to the set of required information; and receiving subsequent input from the user including the information missing from the request, wherein the LLM is configured to generate the API call based at least in part on the subsequent input from the user.

* * * * *